US012194799B2

(12) United States Patent
Ono et al.

(10) Patent No.: US 12,194,799 B2
(45) Date of Patent: Jan. 14, 2025

(54) FORCE SENSOR DIAGNOSIS APPARATUS, VEHICLE, AND RECORDING MEDIUM CONTAINING COMPUTER PROGRAM

(71) Applicant: SUBARU CORPORATION, Tokyo (JP)

(72) Inventors: Tsubasa Ono, Tokyo (JP); Satoshi Yoshizawa, Tokyo (JP); Tomoyuki Okada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/928,831

(22) PCT Filed: Sep. 29, 2021

(86) PCT No.: PCT/JP2021/035776
§ 371 (c)(1),
(2) Date: Nov. 30, 2022

(87) PCT Pub. No.: WO2023/053247
PCT Pub. Date: Apr. 6, 2023

(65) Prior Publication Data
US 2024/0217299 A1 Jul. 4, 2024

(51) Int. Cl.
*B60G 17/019* (2006.01)
*B60G 17/0185* (2006.01)
*G01L 25/00* (2006.01)

(52) U.S. Cl.
CPC ....... *B60G 17/019* (2013.01); *B60G 17/0185* (2013.01); *G01L 25/00* (2013.01); *B60G 2400/64* (2013.01)

(58) Field of Classification Search
CPC .............. B60G 17/019; B60G 17/0185; B60G 2400/64; G01L 25/00
See application file for complete search history.

(56) References Cited

U.S. PATENT DOCUMENTS 8,271,175 B2 * 9/2012 Takenaka ............... B62D 6/003
701/72
8,755,971 B2 * 6/2014 MacFarlane ....... B60G 17/0525
701/91
(Continued)

FOREIGN PATENT DOCUMENTS

| CN | 110126575 A | * | 8/2019 | ........... B60G 17/019 |
| DE | 102008010113 A1 | * | 8/2009 | ......... B60G 17/0185 |

(Continued)

OTHER PUBLICATIONS

International Search Report in the corresponding International Application No. PCT/JP2021/035776 dated Dec. 21, 2021, with English Translation (4 pages).

*Primary Examiner* — Octavia Hollington
(74) *Attorney, Agent, or Firm* — Rimon P.C.

(57) ABSTRACT

A force sensor diagnosis apparatus performs a process of diagnosing a malfunction of a force sensor to detect external force applied to a wheel of a vehicle. The force sensor diagnosis apparatus acquires, based on a sensor signal of the force sensor, a vehicle-height direction force component detection value that is a force component in a height direction of the vehicle of external force applied to the wheel, calculates a vehicle-height direction force component estimation value on the basis of a sensor signal of a displacement sensor provided in a part of a suspension of the wheel and detects a state quantity corresponding to a stroke displacement of the suspension due to external force received by the wheel from a road surface, and performs malfunction determination of the force sensor by comparing the vehicle-height direction force component detection value and the vehicle-height direction force component estimation value.

7 Claims, 7 Drawing Sheets

(56) References Cited

U.S. PATENT DOCUMENTS

| | | |
|---|---|---|
| 2005/0012501 A1 | 1/2005 | Isono et al. |
| 2007/0073494 A1 | 3/2007 | Isono et al. |
| 2009/0276113 A1* | 11/2009 | Sugimoto ............. B60T 8/1725 |
| | | 701/31.4 |
| 2020/0250899 A1 | 8/2020 | Sakakibara |

FOREIGN PATENT DOCUMENTS

| | | | |
|---|---|---|---|
| JP | 2003-104139 A | 4/2003 | |
| JP | 2018-83505 A | 5/2018 | |
| JP | 2020-122753 A | 8/2020 | |
| WO | WO-2021132511 A1 * | 7/2021 | ......... B60G 17/0164 |

* cited by examiner

[FIG. 1]
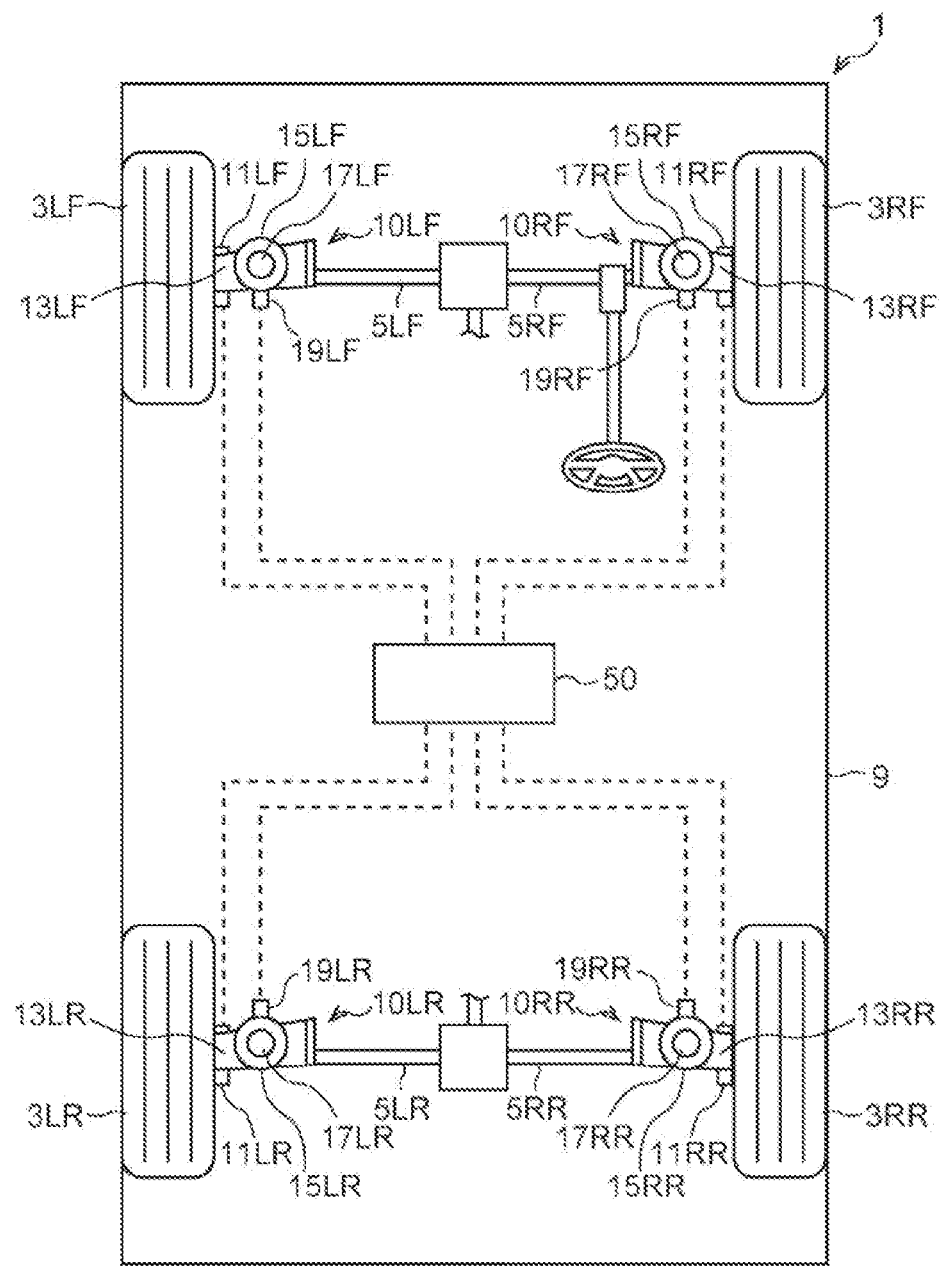

[ FIG. 2 ]
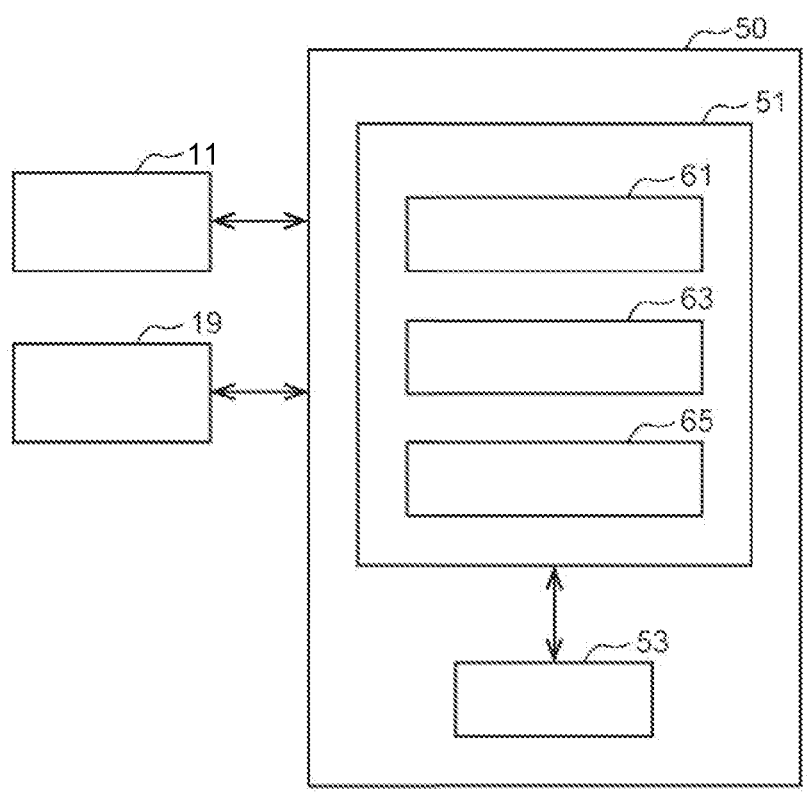

[ FIG. 3 ]
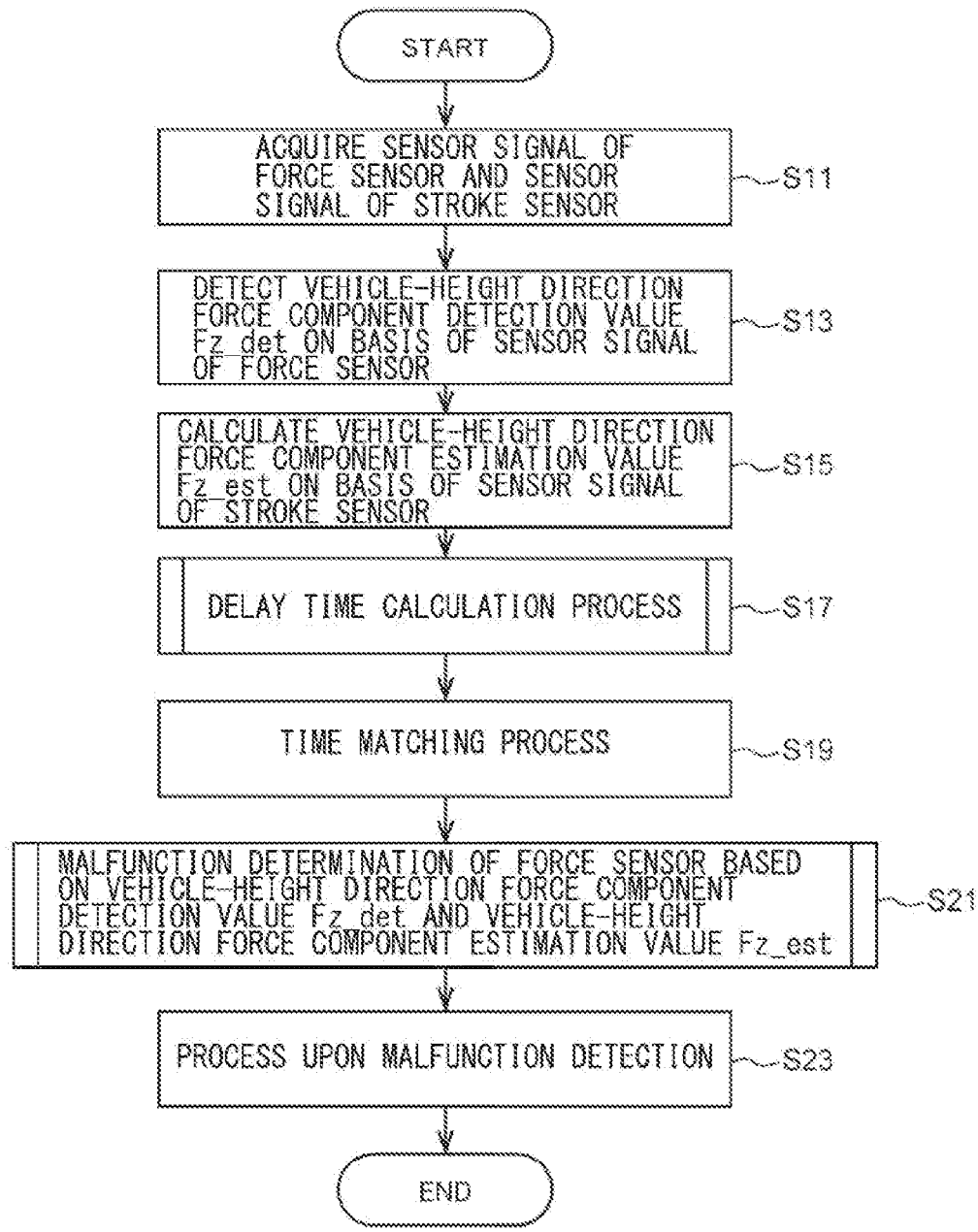

[ FIG. 4 ]
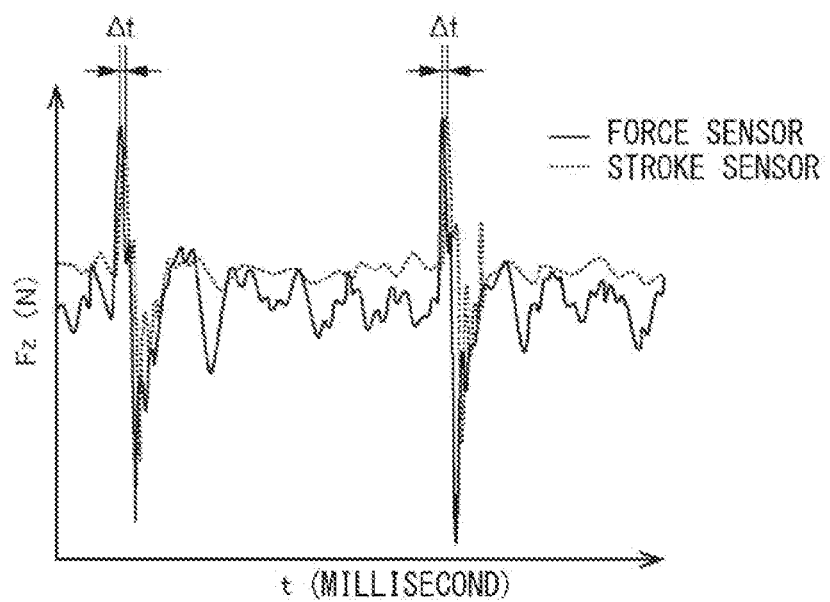

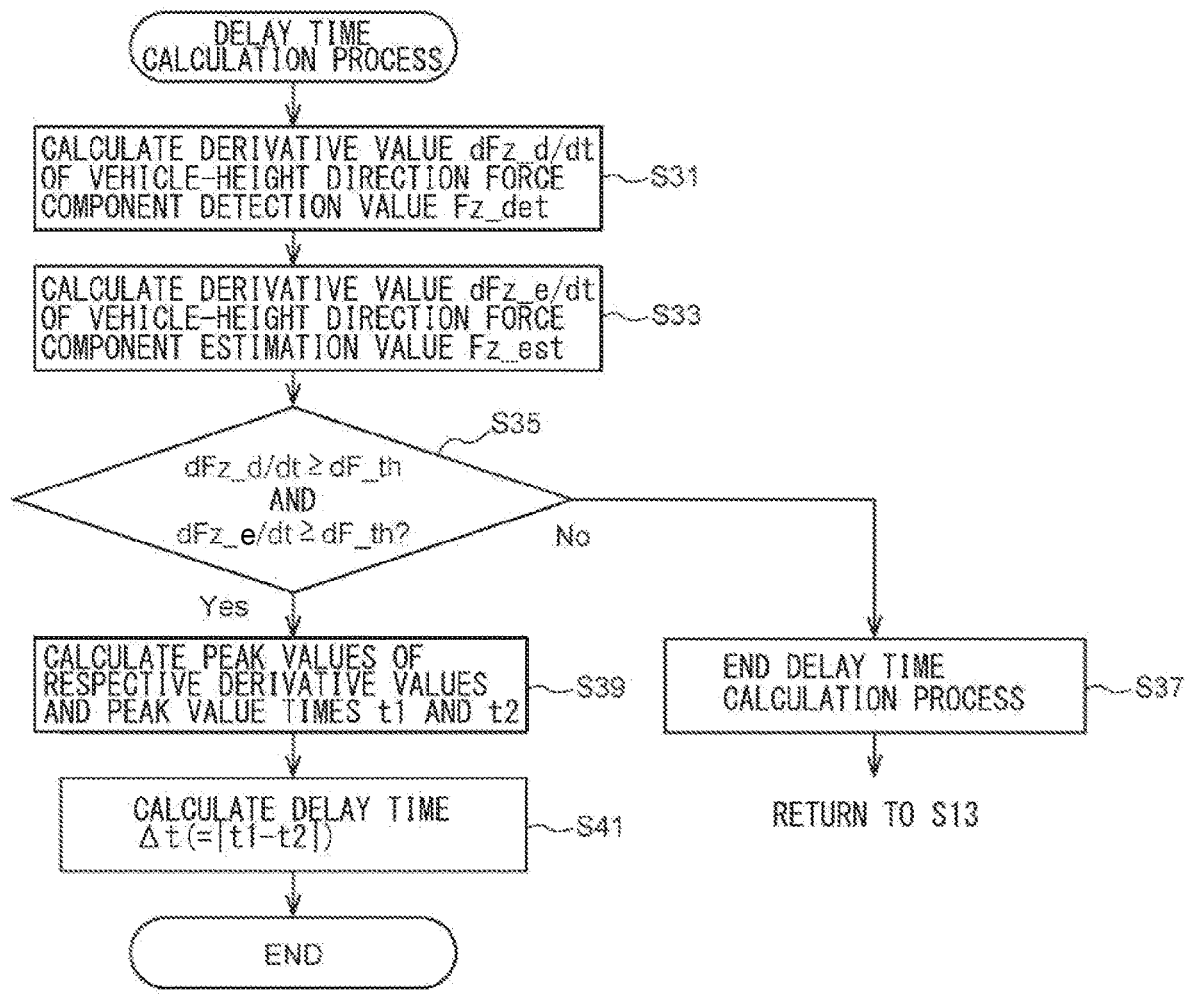

[ FIG. 6 ]
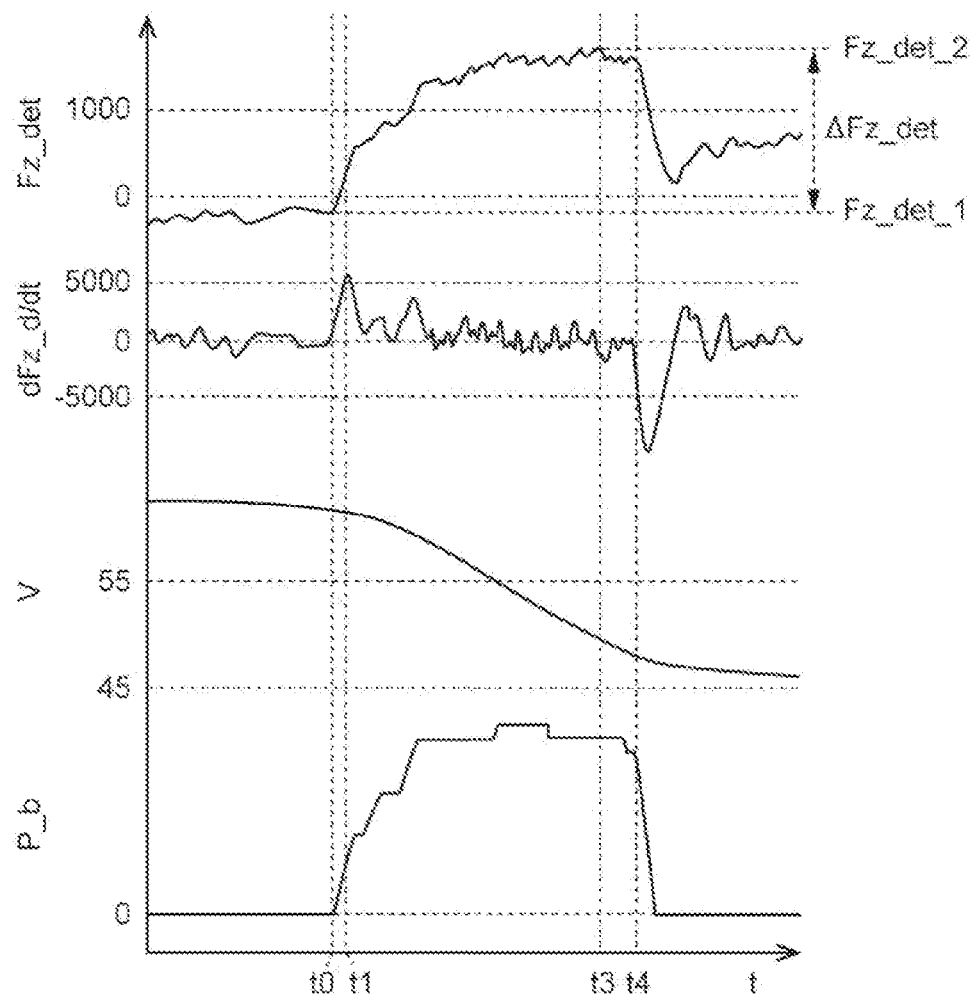

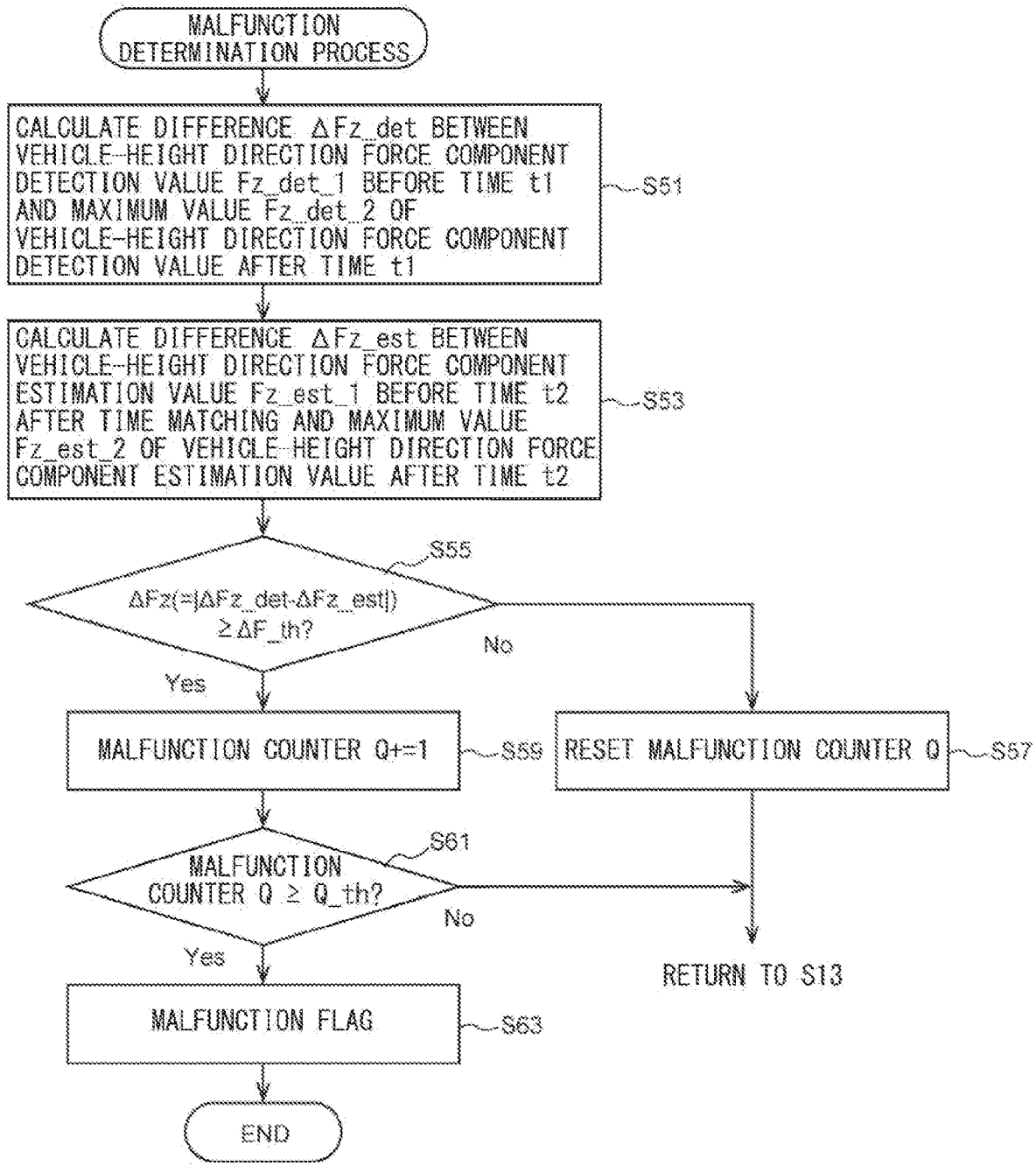

FORCE SENSOR DIAGNOSIS APPARATUS, VEHICLE, AND RECORDING MEDIUM CONTAINING COMPUTER PROGRAM

CROSS REFERENCE TO RELATED APPLICATIONS

This application is the U.S. National Phase under 35 US.C. § 371 of International Application No. PCT/JP2021/035776, filed on Sep. 29, 2021, the entire contents of each are hereby incorporated by reference.

TECHNICAL FIELD

The disclosure relates to a force sensor diagnosis apparatus to be provided in a vehicle provided with a force sensor, to a vehicle, and to a recording medium containing a computer program.

BACKGROUND ART

A tire force sensor that detects tire force acting on a tire mounted on a vehicle has been known. For example, Patent Literature 1 discloses a tire force estimation system and a tire force estimation method that acquire a physical quantity of a tire measured by a sensor provided on the tire, and input the acquired physical quantity of the tire to a calculation model to calculate tire force. Patent Literature 1 describes that a tire force sensor is able to detect, of the tire force, any one component or any combination of two components out of three axial components of longitudinal force in a longitudinal direction of the tire, lateral force in a lateral direction, and load in a vertical direction, or all of the three axial components.

In addition, Patent Literature 2 discloses a tire force sensor that measures, as external force received by a wheel from a road surface, six force components of force components in orthogonal three axial directions (x: a direction in which a vehicle travels (a vehicle-length direction), y: an axial direction of a rack shaft (a vehicle-width direction), z: a vertical direction of the vehicle (a vehicle-height direction)) and three moments about the three axes.

CITATION LIST

Patent Literature

Patent Literature 1: Japanese Unexamined Patent Application Publication No. 2020-122753
Patent Literature 2: Japanese Unexamined Patent Application Publication No. 2018-83505

SUMMARY OF INVENTION

Problem to be Solved by the Invention

In a case where such a tire force sensor is mounted on a vehicle, a sensor value of the tire force sensor is improved in reliability if a function of detecting a malfunction of the tire force sensor is provided. However, in view of cost and sensor mountability, it is impractical to add another sensor configured to detect the same force components for a duplexed system, and compare sensor values to perform malfunction detection.

The disclosure has been made in view of the above-described issue, and it is an object of the disclosure to provide a force sensor diagnosis apparatus, a vehicle, and a recording medium containing a computer program that achieve a function of detecting a malfunction of a tire force sensor mounted on a vehicle, without duplexing the tire force sensor.

Means for Solving the Problem

To solve the above-described problem, an aspect of the disclosure provides a force sensor diagnosis apparatus configured to perform a process of diagnosing a malfunction of a force sensor configured to detect external force applied to a wheel of a vehicle. The force sensor diagnosis apparatus includes one or more processors, and one or more memories communicably coupled to the one or more processors. The one or more processors are configured to: acquire a vehicle-height direction force component detection value on the basis of a sensor signal of the force sensor, the vehicle-height direction force component detection value being a force component in a height direction of the vehicle of external force applied to the wheel; calculate a vehicle-height direction force component estimation value on the basis of a sensor signal of a displacement sensor that is provided in a part of a suspension of the wheel and detects a state quantity corresponding to a stroke displacement of the suspension due to external force received by the wheel from a road surface; and perform malfunction determination of the force sensor by comparing the vehicle-height direction force component detection value detected by the force sensor and the vehicle-height direction force component estimation value estimated on the basis of the sensor signal of the displacement sensor.

To solve the above-described problem, another aspect of the disclosure provides a force sensor diagnosis apparatus configured to perform a process of diagnosing a malfunction of a force sensor configured to detect external force applied to a wheel of a vehicle. The force sensor diagnosis apparatus includes: a vehicle-height direction force component detection unit configured to acquire a vehicle-height direction force component detection value on the basis of a sensor signal of the force sensor, the vehicle-height direction force component detection value being a force component in a height direction of the vehicle of external force applied to the wheel: a vehicle-height direction force component estimation unit configured to calculate a vehicle-height direction force component estimation value on the basis of a sensor signal of a displacement sensor that is provided in a part of a suspension of the wheel and detects a state quantity corresponding to a stroke displacement of the suspension due to external force received by the wheel from a road surface; and a diagnosis unit configured to perform malfunction determination of the force sensor by comparing the vehicle-height direction force component detection value detected by the force sensor and the vehicle-height direction force component estimation value estimated on the basis of the sensor signal of the displacement sensor.

To solve the above-described problem, still another aspect of the disclosure provides a vehicle provided with a force sensor configured to detect external force applied to a wheel of the vehicle. The vehicle includes a diagnosis apparatus configured to perform a process of diagnosing a malfunction of the force sensor. The diagnosis apparatus includes one or more processors, and one or more memories communicably coupled to the one or more processors. The one or more processors are configured to: acquire a sensor signal of a displacement sensor that is provided in a part of a suspension of the wheel and detects a state quantity corresponding to a stroke displacement of the suspension due to external force received by the wheel from a road surface: acquire a vehicle-height direction force component detection value on the basis of a sensor signal of the force sensor, the vehicle-height direction force component detection value being a force component in a height direction of the vehicle of external force applied to the wheel: and perform malfunction determination of the force sensor on the basis of the state quantity detected by the displacement sensor and the vehicle-height direction force component detection value detected by the force sensor.

To solve the above-described problem, still another aspect of the disclosure provides a recording medium containing a computer program to be applied to a diagnosis apparatus configured to perform a process of diagnosing a malfunction of a force sensor configured to detect external force applied to a wheel in at least a vehicle-height direction. The computer program causes one or more processors to execute processing including: acquiring a sensor signal of a displacement sensor that is provided in a part of a suspension of the wheel and detects a state quantity corresponding to a stroke displacement of the suspension due to external force received by the wheel from a road surface; acquiring a vehicle-height direction force component detection value on the basis of a sensor signal of the force sensor, the vehicle-height direction force component detection value being a force component in a height direction of the vehicle of external force applied to the wheel; and performing malfunction determination of the force sensor on the basis of the state quantity detected by the displacement sensor and the vehicle-height direction force component detection value detected by the force sensor.

Effects of the Invention

According to the disclosure as described above, it is possible to achieve a function of detecting a malfunction of a tire force sensor mounted on a vehicle, without duplexing the tire force sensor.

BRIEF DESCRIPTION OF DRAWINGS

FIG. 1 is a schematic diagram illustrating a configuration example of a vehicle including a force sensor diagnosis apparatus according to an embodiment of the disclosure.

FIG. 2 is a block diagram illustrating a configuration example of the force sensor diagnosis apparatus according to the embodiment.

FIG. 3 is a flowchart illustrating a diagnosis process to be executed by the diagnosis apparatus according to the embodiment.

FIG. 4 is an explanatory diagram illustrating a force component in a z direction detected by a force sensor and a stroke detected by a stroke sensor, respectively converted into a vehicle-height direction force component detection value and a vehicle-height direction force component estimation value.

FIG. 5 is a flowchart illustrating a delay time calculation process to be executed by the diagnosis apparatus according to the embodiment.

FIG. 6 is an explanatory diagram illustrating an example of setting of a differentiation threshold by the diagnosis apparatus according to the embodiment.

FIG. 7 illustrates a flowchart of an example of a force sensor malfunction determination process to be executed by the diagnosis apparatus according to the embodiment.

MODES FOR CARRYING OUT THE INVENTION

In the following, some preferred embodiments of the disclosure are described in detail with reference to the accompanying drawings. Throughout the present description and the drawings, elements having substantially the same function and configuration are denoted with the same reference numerals to avoid any redundant description.

<1. Configuration of Vehicle>

A description is given first of an example of a configuration of a vehicle to which a force sensor diagnosis apparatus according to an embodiment of the disclosure is applicable.

FIG. 1 is a schematic diagram illustrating a configuration example of a vehicle 1 including a force sensor diagnosis apparatus 50 according to the present embodiment. The vehicle 1 illustrated in FIG. 1 is a four-wheeled vehicle including four wheels 3. The vehicle 1 is not limited to the four-wheeled vehicle, and may be another vehicle, for example, a two-wheeled vehicle or a commercial vehicle such as a bus or a truck.

In FIG. 1, the four wheels 3 and suspensions 10 disposed for the respective wheels 3, for example, are denoted by the reference numerals having additional characters LF (left front), RF (right front), LR (left rear), and RR (right rear) at the ends. Further, in the following description, the additional characters LF, RF, LR, and RR are omitted as appropriate, unless a particular distinction is to be made.

The suspension 10 has one end coupled to a vehicle body 9, and suspends the wheel 3 on another end side. The suspension 10 includes a suspension arm 13, a spring 15, and a damper 17. The wheel 3 is coupled to an axle 5, and is supported to be rotatable with respect to the vehicle body 9. In addition, the wheel 3 is supported by the vehicle body 9 to be able to be displaced in a vertical direction with respect to the vehicle body 9 by the suspension arm 13.

The damper 17 has an upper end coupled to the vehicle body 9 and a lower end coupled to a support supporting the axle 5 or to the suspension arm 13. The spring 15 is provided between a rod and a cylinder of the damper 17. The spring 15 suppresses transmission, to the vehicle body 9, of unevenness of a road surface and impact received by the wheel 3 from the road surface. The damper 17 dampens vibration caused by the vehicle body 9 and the wheel 3 being relatively displaced vertically.

In addition, the suspension 10 is provided with a stroke sensor 19 that detects a relative displacement between the vehicle body 9 and the wheel 3. The stroke sensor 19 is a mode of a displacement sensor that is provided in a part of the suspension 10 and detects a state quantity corresponding to a stroke displacement of the suspension 10 due to external force received by the wheel 3 from the road surface. The stroke displacement of the suspension 10 corresponds to the relative displacement between the vehicle body 9 and the wheel 3. The stroke sensor 19 may be, for example, a sensor that detects a relative displacement between the rod and the cylinder of the damper 17 (a stroke). A position where the stroke sensor 19 is provided is not particularly limited as long as the sensor is able to detect the relative displacement between the vehicle body 9 and the wheel 3. A sensor signal outputted from the stroke sensor 19 is inputted to the diagnosis apparatus 50.

The wheel 3 is provided with a force sensor 11 that detects external force (tire force) applied to the wheel 3. The force sensor 11 is configured to detect at least a force component in a vehicle-height direction (a z direction). For example, the force sensor 11 may be a sensor that detects force components in a vehicle-length direction (a x direction), a vehicle-width direction (a y direction), and the vehicle-height direction (the z direction) acting on the axle 5 supporting the wheel 3, and moments about the x-direction, y-direction, and z-direction axes. The force sensor 11 is not limited in type. A sensor signal outputted from the force sensor 11 is inputted to the diagnosis apparatus 50.

The diagnosis apparatus 50 acquires the sensor signal of the stroke sensor 19 and the sensor signal of the force sensor 11, and executes a malfunction determination process of the force sensor 11. The diagnosis apparatus 50 is described in detail below.

<2. Force Sensor Diagnosis Apparatus>
(2-1. Configuration of Diagnosis Apparatus)

FIG. 2 is a block diagram illustrating an example of a configuration of the diagnosis apparatus 50. The diagnosis apparatus 50 includes, for example, one or more processors and one or more memories communicably coupled to the processor. Examples of the one or more processors include a central processing unit (CPU). Examples of the one or more memories include a random access memory (RAM) and a read only memory (ROM). The diagnosis apparatus 50 may partially or entirely be configured by updatable software such as firmware, or may be a program module to be executed in response to a command from the processor, for example.

The diagnosis apparatus 50 serves as an apparatus that diagnoses a malfunction of the force sensor 11 by the one or more processors executing a computer program. The computer program is a computer program that causes the processor to execute operation to be executed by the diagnosis apparatus 50, which will be described later. The computer program to be executed by the processor may be recorded in a recording medium serving as a storage (memory) 53 included in the diagnosis apparatus 50, or may be recorded in a recording medium built in the diagnosis apparatus 50 or any recording medium externally attachable to the diagnosis apparatus 50.

Examples of the recording medium that records the computer program include: a magnetic medium such as a hard disk, a floppy disk, or a magnetic tape; an optical recording medium such as a compact disk read only memory (CD-ROM), a digital versatile disk (DVD), or Blu-ray (registered trademark); a magneto-optical medium such as a floptical disk: a memory such as a RAM or a ROM: a flash memory such as a universal serial bus (USB) memory: and another medium that is able to store a program.

The force sensor 11 and the stroke sensor 19 provided for each of the wheels 3 are coupled to the diagnosis apparatus 50. The force sensor 11 and the stroke sensor 19 are coupled to the diagnosis apparatus 50 via a dedicated line or a communication bus such as a controller area network (CAN).

The diagnosis apparatus 50 includes a processor 51 and the storage 53. The processor 51 includes a vehicle-height direction force component detection unit 61, a vehicle-height direction force component estimation unit 63, and a diagnosis unit 65. The processor 51 is one or more processors such as a CPU. The units of the vehicle-height direction force component detection unit 61, the vehicle-height direction force component estimation unit 63, and the diagnosis unit 65 are functions implemented by execution of the computer program by the processor. Note that the vehicle-height direction force component detection unit 61, the vehicle-height direction force component estimation unit 63, and the diagnosis unit 65 may partially be configured by an analog circuit.

The storage 53 includes one or more memories such as a RAM or a ROM, or a storage device such as a hard disk drive (HDD) or a solid state drive (SSD). The storage 53 stores a program to be executed by the processor 51, various parameters to be used for executing the program, acquired data, and data on a calculation result, for example.

The following briefly describes the functions of the units of the processor 51, and then describes specific processing operation of the processor 51.

(2-1-1. Vehicle-Height Direction Force Component Detection Unit)

The vehicle-height direction force component detection unit 61 acquires, on the basis of the sensor signal of the force sensor 11, a vehicle-height direction force component detection value Fz_det that is a force component in a height direction of the vehicle 1, of external force applied to the wheel 3. For example, in a case where the force sensor 11 is a sensor configured to detect six force components of force components in the x direction, the y direction, and the z direction and moments about the respective direction axes, the vehicle-height direction force component detection unit 61 acquires at least an output of the force component in the z direction as the vehicle-height direction force component detection value Fz_det.

(2-1-2. Vehicle-Height Direction Force Component Estimation Unit)

The vehicle-height direction force component estimation unit 63 calculates a vehicle-height direction force component estimation value Fz_est on the basis of the sensor signal of the stroke sensor 19. Specifically, the vehicle-height direction force component estimation unit 63 obtains the vehicle-height direction force component estimation value Fz_est by calculation, on the basis of a stroke S detected on the basis of the sensor signal of the stroke sensor 19 and vehicle data recorded in the storage 53 in advance. The stroke is dependent on displacements of the spring 15 and the damper 17. The displacements of the spring 15 and the damper 17 differ depending on an installation position of the stroke sensor 19 and a structure of the suspension 10. Therefore, the vehicle-height direction force component estimation unit 63 converts the stroke S detected by the stroke sensor 19 into the force component in the z direction by using the vehicle data.

The vehicle data recorded in the storage 53 includes, in accordance with specifications of each vehicle 1, a first map that converts the stroke S into a displacement Da of the spring 15 depending on the installation position of the stroke sensor 19, and a second map that converts the stroke S into a displacement db of the damper 17 depending on the installation position of the stroke sensor 19. Relationships between the stroke S detected by the stroke sensor 19 and the displacement Da of the spring 15 and the displacement db of the damper 17 may each be obtained in advance from the structure of the suspension 10.

In a case where the relationships between the stroke S detected by the stroke sensor 19 and the displacement Da of the spring 15 and the displacement db of the damper 17 exhibit linearity, conversion formulas represented by the following expressions (1) and (2) may be recorded in place of the first map and the second map.

$$Da = \alpha \times S \quad (1)$$

$$Db = \beta \times S \quad (2)$$

In the expressions (1) and (2), α and β are conversion factors for conversion of the stroke S into the displacement Da of the spring 15 and the displacement db of the damper 17 respectively.

In addition, the vehicle data includes data on a spring constant ks of the spring 15 and a damping coefficient C of the damper 17. The data on the spring constant ks of the spring 15 and the damping coefficient C of the damper 17 are identified by specifications of the spring 15 and the damper 17 that are used. In a case where the vehicle 1 includes a stabilizer, the vehicle data includes data on a spring constant kp at an installation position of the stabilizer. The spring constant kp at the installation position of the stabilizer may be obtained in advance from the structure of the suspension 10. The vehicle data also includes data on a steering angle of the wheels 3 (the steered wheels 3LF and 3RF) with respect to an orientation (the vehicle-length direction) of the vehicle 1, detected by an unillustrated steering angle sensor while the vehicle 1 is traveling. The vehicle-height direction force component estimation unit 63 calculates, by using the vehicle data, the vehicle-height direction force component estimation value Fz_est from the stroke S detected by the stroke sensor 19.

Note that, in a case where the vehicle 1 includes an air suspension that adjusts the displacement between the vehicle body 9 and the wheel 3, the vehicle-height direction force component estimation unit 63 calculates the vehicle-height direction force component estimation value Fz_est by using a value from which a stroke displacement due to a function of the air suspension, independent of external force received by the wheel 3 from the road surface, is subtracted.

(2-1-3. Diagnosis Unit)

The diagnosis unit 65 performs the malfunction determination process of the force sensor 11 by comparing the vehicle-height direction force component detection value Fz_det detected by the force sensor 11 and the vehicle-height direction force component estimation value Fz_est estimated on the basis of the sensor signal of the stroke sensor 19. In the present embodiment, the diagnosis unit 65 obtains delay time elapsed after external force received by the wheel 3 from the road surface is detected by the force sensor 11 until the external force appears in the stroke S detected by the stroke sensor 19. In addition, the diagnosis unit 65 performs malfunction determination of the force sensor 11 by comparing the vehicle-height direction force component detection value Fz_det and the vehicle-height direction force component estimation value Fz_est obtained on the basis of the sensor signals reflecting the same external force received by the wheel 3 at a given time.

(1-2-3. Operation)

A description is given next, along flowcharts, of a specific operation example of the diagnosis apparatus 50 for the force sensor 11 according to the present embodiment. FIG. 3 is a flowchart illustrating a diagnosis process to be executed by the diagnosis apparatus 50. Note that the diagnosis process described below may be executed at all times while a vehicle-mounted system is in operation, or may be set to be executed at appropriate timing, such as for each predetermined travel distance or each predetermined travel time.

First, the processor 51 of the diagnosis apparatus 50 acquires each of the sensor signal of the force sensor 11 and the sensor signal of the stroke sensor 19 (step S11). Specifically, the processor 51 acquires the sensor signal of the force sensor 11 and the sensor signal of the stroke sensor 19 in every predetermined processing cycle. The processor 51 records, as time-series data, each of the acquired sensor signals in the storage 53 together with data on a time.

Thereafter, the vehicle-height direction force component detection unit 61 of the processor 51 detects the vehicle-height direction force component detection value Fz_det on the basis of the sensor signal of the force sensor 11 (step S13). For example, in a case where the force sensor 11 is the above-described sensor that detects the six force components, the vehicle-height direction force component detection unit 61 obtains a sensor value (e.g., a voltage value) indicating the force component in the z direction, out of sensor values indicating the six force components included in the sensor signal. In addition, the vehicle-height direction force component detection unit 61 records the force component in the z direction indicated by the sensor value of the force sensor 11 acquired in every predetermined processing cycle, as the vehicle-height direction force component detection value Fz_det, in the storage 53 in association with data on the sensor value and the time. At this time, the vehicle-height direction force component detection unit 61 may perform a filtering process on the detected sensor value or the vehicle-height direction force component detection value Fz_det. The filtering process may be, for example, performed by using a moving-average filter or a low-pass filter, or performed by using another appropriate filter.

Thereafter, the vehicle-height direction force component estimation unit 63 of the processor 51 calculates the vehicle-height direction force component estimation value Fz_est on the basis of the sensor signal of the stroke sensor 19 (step S15). For example, the vehicle-height direction force component estimation unit 63 calculates, on the basis of S indicated by the sensor signal of the stroke sensor 19, the vehicle-height direction force component estimation value Fz_est by using the following expression (3).

$$\text{Fz\_est} = ks \times Da + C \times (dDb/dt) + kp \times Dp \qquad (3)$$

Fz_est: the vehicle-height direction force component estimation value
ks: the spring constant of the spring 15
kp: the spring constant at the installation position of the stabilizer
C: the damping coefficient of the damper 17
Da: the displacement of the spring 15
db: the displacement of the damper 17
Dp: a displacement due to torsion of the stabilizer (an expansion or contraction amount of the stabilizer)
t: the time The displacement Da of the spring 15 and the displacement db of the damper 17 may be calculated on the basis of the stroke S detected by the stroke sensor 19, by using the first map and the second map or the above expressions (1) and (2) recorded in the storage 53 in advance. The displacement Dp due to the torsion of the stabilizer may be calculated on the basis of the stroke S, by using a map or a conversion formula similar to the first map and the second map described above or the above expressions (1) and (2) and stored in advance in accordance with the structure of the suspension 10. Note that, in a case where the vehicle 1 does not include the stabilizer, the term "kp×Dp" of the above expression (3) is set to zero or omitted.

Unit time dt used in obtaining a derivative value dDb of the displacement db of the damper 17 is a time interval of the processing cycle in which the sensor signal of the stroke sensor 19 is acquired. The vehicle-height direction force component estimation unit 63 stores the vehicle-height direction force component estimation value Fz_est estimated on the basis of a sensor value of the stroke sensor 19 acquired in every predetermined processing cycle in the storage 53 in association with data on the sensor value and the time. At this time, the vehicle-height direction force component estimation unit 63 may perform a filtering process on the detected sensor value or the vehicle-height direction force component estimation value Fz_est. The filtering process may be, for example, performed by using a moving-average filter or a low-pass filter, or performed by using another appropriate filter.

Thereafter, the diagnosis unit 65 executes a delay time calculation process (step S17). The delay time calculation process is a process that makes it possible to perform the malfunction determination of the force sensor 11 by comparing the vehicle-height direction force component detection value Fz_det and the vehicle-height direction force component estimation value Fz_est obtained on the basis of the sensor signals reflecting the same external force received by the wheel 3 at the same time. The diagnosis unit 65 calculates the delay time elapsed after external force received by the wheel 3 at the same time is detected by the force sensor 11 until the same external force appears in the stroke S detected by the stroke sensor 19.

FIG. 4 to FIG. 6 are explanatory diagrams illustrating a process of calculating the delay time.

FIG. 4 illustrates the force component in the z direction detected by the force sensor 11 and the stroke S detected by the stroke sensor 19, respectively converted into the vehicle-height direction force component detection value Fz_det and the vehicle-height direction force component estimation value Fz_est. In two regions where peak values appear in FIG. 4, comparison of times t at which the respective peak values are detected indicate occurrence of delay time Δt after the peak value appears in the sensor value of the force sensor 11 until the peak value appears in the sensor value of the stroke sensor 19. Consequently, to determine whether the sensor value of the force sensor 11 is adequate data, it is necessary to resolve a sensor value discrepancy corresponding to the delay time.

FIG. 5 is a flowchart illustrating the process of calculating the delay time.

First, the diagnosis unit 65 calculates a derivative value dFz_d/dt of the vehicle-height direction force component detection value Fz_det (step S31). The diagnosis unit 65 calculates the derivative value dFz_d/dt of the vehicle-height direction force component detection value Fz_det, for example, by subtracting, from each vehicle-height direction force component detection value Fz_det calculated in the predetermined processing cycle and recorded in the storage 53, the vehicle-height direction force component detection value Fz_det calculated in the immediately preceding processing cycle. The derivative value dFz_d/dt of each vehicle-height direction force component detection value Fz_det is recorded in the storage 53 in association with data on the sensor value, the vehicle-height direction force component detection value Fz_det, and the time.

Thereafter, the diagnosis unit 65 calculates a derivative value dFz_e/dt of the vehicle-height direction force component estimation value Fz_est (step S33). As in step S31, the diagnosis unit 65 calculates the derivative value dFz_e/dt of the vehicle-height direction force component estimation value Fz_est, for example, by subtracting, from each vehicle-height direction force component estimation value Fz_est calculated in the predetermined processing cycle and recorded in the storage 53, the vehicle-height direction force component estimation value Fz_est calculated in the immediately preceding processing cycle. The derivative value dFz_e/dt of each vehicle-height direction force component estimation value Fz_est is recorded in the storage 53 in association with data on the sensor value, the vehicle-height direction force component estimation value Fz_est, and the time.

Thereafter, the diagnosis unit 65 determines whether the derivative value dFz_d/dt of the vehicle-height direction force component detection value Fz_det and the derivative value dFz_e/dt of the vehicle-height direction force component estimation value Fz_est are each equal to or greater than a differentiation threshold dF_th set in advance (step S35). Here, the differentiation threshold dF_th is provided for the derivative values dFz_e/dt and dFz_d/dt of the respective values to allow the delay time Δt to be obtained only in a case where a rate of increase in the vehicle-height direction force component detection value Fz_det and the vehicle-height direction force component estimation value Fz_est per unit time dt is equal to or greater than a predetermined threshold. The differentiation threshold dF_th may be set to any value. For example, the differentiation threshold dF_th may be set in consideration of the sensor value detected or a value reached by the force component in the z direction when the vehicle 1 decelerates suddenly.

FIG. 6 is an explanatory diagram illustrating an example of setting of the differentiation threshold dF_th. FIG. 6 illustrates changes over time in a brake pressure P_b applied to a wheel cylinder of the wheel 3, a vehicle speed V, the vehicle-height direction force component detection value Fz_det, and the derivative value dFz_d/dt of the vehicle-height direction force component detection value Fz_det. In the example illustrated in FIG. 6, a brake operation is performed at a time t0 to cause the brake pressure P_b to increase abruptly, and the vehicle 1 starts deceleration. Accordingly, the vehicle-height direction force component detection value Fz_det detected by the force sensor 11 also increases abruptly, and the derivative value dFz_d/dt of the vehicle-height direction force component detection value Fz_det exceeds 5000. In this case, the differentiation threshold dF_th is set to, for example, 5000.

The delay time Δt is obtained by using the vehicle-height direction force component detection value Fz_det and the vehicle-height direction force component estimation value Fz_est in a case where apparent peaks as illustrated in FIG. 6 appear. This makes it is possible to prevent burden on the processor from becoming too large by the number of calculations of the delay time Δt becoming too large. It is also possible to prevent a decrease in accuracy of a calculation result of the delay time Δt, consequently in accuracy of a malfunction detection result of the force sensor 11, due to a decrease in accuracy of matching between the vehicle-height direction force component detection value Fz_det and the vehicle-height direction force component estimation value Fz_est to be compared, out of the vehicle-height direction force component detection values Fz_det and the vehicle-height direction force component estimation values Fz_est recorded in the storage 53.

Note that the diagnosis unit 65 may determine whether a combination in which the derivative value dFz_d/dt and the derivative value dFz_e/dt are each equal to or greater than the differentiation threshold dF_th set in advance is included in combinations of the derivative value dFz_d/dt of the vehicle-height direction force component detection value Fz_det and the derivative value dFz_e/dt of the vehicle-height direction force component estimation value Fz_est at times within a time difference equal to or less than a maximum value of the delay time assumed in advance. This makes it possible to prevent the sensor values reflecting external force applied to the wheel 3 at different times from being subjected to comparison.

If at least one of the derivative value $dFz\_d/dt$ of the vehicle-height direction force component detection value Fz_det or the derivative value $dFz\_e/dt$ of the vehicle-height direction force component estimation value Fz_est is not equal to or greater than the differentiation threshold dF_th (S35/No), the diagnosis unit 65 ends the process of calculating the delay time $\Delta t$ (step S37), and returns to step S11 in FIG. 3. In contrast, if the derivative value $dFz\_d/dt$ of the vehicle-height direction force component detection value Fz_det and the derivative value $dFz\_e/dt$ of the vehicle-height direction force component estimation value Fz_est are both equal to or greater than the differentiation threshold dF_th (S35/Yes), the diagnosis unit 65 calculates times t1 and t2 at the peaks where the derivative value $dFz\_d/dt$ of the vehicle-height direction force component detection value Fz_det and the derivative value $dFz\_e/dt$ of the vehicle-height direction force component estimation value Fz_est have each become equal to or greater than the differentiation threshold dF_th (step S39).

Specifically, the diagnosis unit 65 identifies a maximum value of the vehicle-height direction force component detection value Fz_det in a case where the derivative value $dFz\_d/dt$ of the vehicle-height direction force component detection value Fz_det has become equal to or greater than the differentiation threshold dF_th, and obtains the time t1 associated with the maximum value. Similarly, the diagnosis unit 65 identifies a maximum value of the vehicle-height direction force component estimation value Fz_est in a case where the derivative value $dFz\_e/dt$ of the vehicle-height direction force component estimation value Fz_est has become equal to or greater than the differentiation threshold dF_th, and obtains the time t2 associated with the maximum value.

Thereafter, the diagnosis unit 65 calculates a time difference between the calculated two times t1 and t2 to obtain the delay time $\Delta t$ (step S41). Thus calculated is the delay time $\Delta t$ elapsed after external force applied to the wheel 3 at the same time is detected by the force sensor 11 until the external force appears in the stroke S detected by the stroke sensor 19.

Referring back to FIG. 3, the diagnosis unit 65 performs time matching of the data on the vehicle-height direction force component detection value Fz_det and the vehicle-height direction force component estimation value Fz_est, by shifting the time of either of the recorded vehicle-height direction force component detection value Fz_det and vehicle-height direction force component estimation value Fz_est by the delay time $\Delta t$ obtained by the delay time calculation process (step S19). This brings about a state in which malfunction detection of the force sensor 11 is executable by using the sensor value of the force sensor 11 and the sensor value of the stroke sensor 19 reflecting the same external force applied to the wheel 3 at the same time.

Thereafter, the diagnosis unit 65 executes the malfunction determination of the force sensor 11 on the basis of the vehicle-height direction force component detection value Fz_det and the vehicle-height direction force component estimation value Fz_est at the same time after the time matching (step S21). In the present embodiment, the diagnosis unit 65 calculates a difference (first difference) $\Delta Fz\_det$ between a vehicle-height direction force component detection value Fz_det_1 before the time t1 at which the vehicle-height direction force component detection value Fz_det increases abruptly and a positive peak of the derivative value $dFz\_d/dt$ appears, and a maximum value Fz_det_2 of the vehicle-height direction force component detection value Fz_det that appears after the time t1. The diagnosis unit 65 also calculates a difference (second difference) $\Delta Fz\_est$ between a vehicle-height direction force component estimation value Fz_est_1 before the time t2 at which the vehicle-height direction force component estimation value Fz_est increases abruptly and a positive peak of the derivative value $dFz\_e/dt$ appears, and a maximum value Fz_est_2 of the vehicle-height direction force component estimation value Fz_est that appears after the time t2.

In addition, the diagnosis unit 65 determines that the force sensor 11 can be malfunctioning in a case where a discrepancy $\Delta Fz$ between the first difference $\Delta Fz\_det$ and the second difference $\Delta Fz\_est$ described above is equal to or greater than a predetermined measurement threshold $\Delta Fz\_th$, in consideration of a detection accuracy Ea of the force sensor 11 and a detection accuracy Eb of the stroke sensor 19. In addition, in the present embodiment, the diagnosis unit 65 counts up (adds 1 to) a malfunction counter Q if it is determined that the discrepancy $\Delta Fz$ described above is equal to or greater than the predetermined measurement threshold $\Delta Fz\_th$, whereas the diagnosis unit 65 resets the malfunction counter Q if it is not determined that the discrepancy $\Delta Fz$ described above is equal to or greater than the predetermined measurement threshold $\Delta Fz\_th$. The diagnosis unit 65 determines that the force sensor 11 is malfunctioning if the malfunction counter Q reaches a counter threshold Q_th set in advance.

FIG. 7 illustrates a flowchart of an example of the malfunction determination process of the force sensor 11.

First, the diagnosis unit 65 calculates the difference (first difference) $\Delta Fz\_det$ between the vehicle-height direction force component detection value Fz_det_1 before the time t1 and the maximum value Fz_det_2 of the vehicle-height direction force component detection value after the time t1 (step S51). Calculated in step S51 is an increase range of the vehicle-height direction force component detection value Fz_det detected by the force sensor 11 upon application of external force to the wheel 3.

Specifically, in the example illustrated in FIG. 6, the diagnosis unit 65 calculates the difference $\Delta Fz\_det$ between the vehicle-height direction force component detection value Fz_det_1 before the time t1 at which the derivative value $dFz\_d/dt$ becomes equal to or greater than the differentiation threshold dF_th and the maximum value Fz_det_2 of the vehicle-height direction force component detection value Fz_det after the time t1. Used as the vehicle-height direction force component detection value Fz_det_1 is the vehicle-height direction force component detection value Fz_det around the time to immediately before the vehicle-height direction force component detection value Fz_det increases. Used as the maximum value Fz_det_2 of the vehicle-height direction force component detection value Fz_det is the maximum value Fz_det_2 of the vehicle-height direction force component detection value Fz_det detected at a time t3, in a period from the time t1 at which the vehicle-height direction force component detection value Fz_det increases abruptly and the positive peak of the derivative value $dFz\_d/dt$ appears to a time t4 at which the vehicle-height direction force component detection value Fz_det decreases abruptly and a negative peak of the derivative value $dFz\_d/dt$ appears.

Thereafter, the diagnosis unit 65 calculates the difference (second difference) $\Delta Fz\_est$ between the vehicle-height direction force component estimation value Fz_est_1 before the time t2 after the time matching and the maximum value Fz_est_2 of the vehicle-height direction force component estimation value after the time t2 (step S53). Calculated in step S53 is an increase range of the vehicle-height direction force component estimation value Fz_est estimated on the basis of the stroke S detected by the stroke sensor 19 upon application of external force to the wheel 3. Also in step S53, the diagnosis unit 65 similarly calculates the difference ΔFz_est between the vehicle-height direction force component estimation value Fz_est_1 before the time t2 at which the derivative value dFz_e/dt becomes equal to or greater than the differentiation threshold dF_th and the maximum value Fz_est_2 of the vehicle-height direction force component estimation value Fz_est after the time t2.

Thereafter, the diagnosis unit 65 determines whether the discrepancy ΔFz between the first difference ΔFz_det and the second difference ΔFz_est is equal to or greater than the predetermined measurement threshold ΔFz_th (step S55). The measurement threshold ΔFz_th is set, for example, by using the following expression (4), in consideration of the detection accuracy Ea of the force sensor 11 and the detection accuracy Eb of the stroke sensor 19.

$$\Delta Fz\_th = kq \times (Ea + Eb) \quad (4)$$

The detection accuracy Ea of the force sensor 11 and the detection accuracy Eb of the stroke sensor 19 may be set on the basis of, for example, correction amounts such as offset amounts of the sensor values obtained by diagnosis processes of the respective sensors, but a setting method is not limited to this example. A factor kq may be set freely in consideration of an allowable error, for example.

In other words, in a case where the calculated discrepancy ΔFz is equal to or greater than a predetermined level with respect to a discrepancy (Ea+Eb) assumed on the basis of the detection accuracy Ea of the force sensor 11 and the detection accuracy Eb of the stroke sensor 19, the diagnosis unit 65 determines that the force sensor 11 can be malfunctioning.

If the discrepancy ΔFz between the first difference ΔFz_det and the second difference ΔFz_est is less than the predetermined measurement threshold ΔFz_th (S55/No), the diagnosis unit 65 resets the malfunction counter Q (step S57), and returns to step S13 in FIG. 3. In contrast, if the discrepancy ΔFz between the first difference ΔFz_det and the second difference ΔFz_est is equal to or greater than the predetermined measurement threshold ΔFz_th (S55/Yes), the diagnosis unit 65 counts up (adds 1 to) the malfunction counter Q, and updates the malfunction counter Q (step S59).

Thereafter, the diagnosis unit 65 determines whether the malfunction counter Q has reached the counter threshold Q_th set in advance (step S61). The counter threshold Q_th is also used to guarantee a diagnosis system against an erroneous determination, together with the above-described measurement threshold ΔFz_th. For example, in a case where there is a possibility that the malfunction determination process using the measurement threshold ΔFz_th makes an erroneous determination about once out of five times of measurement, the counter threshold Q_th is set to "5". Thus, in a case where the discrepancy ΔFz between the first difference ΔFz_det based on the sensor value of the force sensor 11 and the second difference ΔFz_est based on the sensor value of the stroke sensor 19 becomes equal to or greater than the measurement threshold ΔFz_th five times in a row, it is finally determined that a malfunction has occurred.

If the malfunction counter Q is less than the counter threshold Q_th (S61/No), the diagnosis unit 65 returns to step S13 in FIG. 3, without finally determining occurrence of a malfunction. In contrast, if the malfunction counter Q has reached the counter threshold Q_th (S61/Yes), the diagnosis unit 65 sets a malfunction flag (step S63), and ends the malfunction determination process.

In a case where it is determined that a malfunction has occurred in the malfunction determination process described above, if reliability of the stroke sensor 19 is high, a determination result by the diagnosis unit 65 that a malfunction has occurred may be considered as a result indicating that a malfunction has occurred in the force sensor 11.

In contrast, if the reliability of the stroke sensor 19 is unlikely to be high, a determination result by the diagnosis unit 65 that a malfunction has occurred may be considered as a result indicating that a malfunction has occurred in either one or both of the force sensor 11 or the stroke sensor 19. In this case, it is possible to estimate in which of the force sensor 11 or the stroke sensor 19 the malfunction has occurred, for example, by the following method.

In a case where deceleration operation and acceleration operation are performed in the four-wheeled vehicle, outputs of the force sensor 11 and the stroke sensor 19 as illustrated in FIG. 4 are obtained. In a case of the four-wheeled vehicle, in a case where the deceleration operation and the acceleration operation are performed in a state in which a steering angle of a steering wheel is zero, i.e., a state in which the vehicle 1 is traveling straight, outputs with symmetry may be obtained as sensor outputs at the left front wheel 3LF and the right front wheel 3RF and at the left rear wheel 3LR and the right rear wheel 3RR.

Therefore, after setting the malfunction flag in the malfunction determination process described above, the diagnosis unit 65 executes a process of comparing sensor values of the force sensors 11LF and 11RF and sensor values of the stroke sensors 19LF and 19RF, obtained at the left front wheel 3LF and the right front wheel 3RF. Similarly, the diagnosis unit 65 executes a process of comparing sensor values of the force sensors 11LR and 11RR and sensor values of the stroke sensors 19LR and 19RR, obtained at the left rear wheel 3LR and the right rear wheel 3RR.

The diagnosis unit 65 determines whether there is symmetry between the compared sensor values, and determines that a malfunction has occurred in, out of the left and right force sensors 11 or stroke sensors 19 determined as exhibiting no symmetry, the force sensor 11 or the stroke sensor 19 provided for the wheel 3 where a malfunction is determined as having occurred in the malfunction determination process described above. Thus, even in a case where the reliability of the stroke sensor 19 is unlikely to be high, it is possible to estimate occurrence of a malfunction of the force sensor 11.

Referring back to FIG. 3, if it is determined that a malfunction has occurred in the force sensor 11 in the malfunction determination process, the diagnosis unit 65 executes a process upon malfunction detection (step S23). For example, in a case where the sensor value of the force sensor 11 is used for vehicle dynamics control logic in the vehicle-mounted system, the diagnosis unit 65 executes a process of lowering a degree of reliability of an arithmetic processing result obtained by the control logic. This makes it possible to make the vehicle 1 less likely to enter a dangerous travel state.

For control logic using only the vehicle-height direction force component detection value Fz_det detected by the force sensor 11 in the vehicle-mounted system, the diagnosis unit 65 may substitute the sensor value of the sensor determined as exhibiting no malfunction for the sensor value of the sensor in which a malfunction is determined as having occurred in the above-described process of determining the symmetry between the sensor values detected at the left and right wheels 3. In this case, the diagnosis unit 65 executes a process of lowering a degree of reliability of the sensor value that is substituted.

The diagnosis unit 65 may execute a notification process of prompting a user to bring the vehicle to, for example, a dealer or a repair shop. Further, in a case where the vehicle 1 includes a unit that communicates with the outside of the vehicle, the diagnosis unit 65 may change setting, if a limitation is imposed on arithmetic processing using the sensor value of the force sensor 11, to make it possible to acquire information corresponding to a result of the arithmetic processing from the outside of the vehicle. Note that the process upon malfunction detection described above is an example, and not limited to the exemplified process. The diagnosis unit 65 may be configured to execute an appropriate process.

As described above, the force sensor diagnosis apparatus 50 according to the present embodiment calculates the vehicle-height direction force component estimation value Fz_est on the basis of the sensor signal of the stroke sensor 19 that is provided in a part of the suspension 10 of the wheel 3 and detects the stroke S of the suspension 10 due to external force received by the wheel 3 from the road surface. In addition, the diagnosis apparatus 50 performs the malfunction determination of the force sensor 11 by comparing the vehicle-height direction force component detection value Fz_det detected by the force sensor 11 and the vehicle-height direction force component estimation value Fz_est calculated on the basis of the sensor signal of the stroke sensor 19. Thus, it is possible to detect a malfunction of the force sensor 11 by using another existing sensor mounted on the vehicle, instead of duplexing the same force sensor. Consequently, a function of detecting a malfunction of the force sensor 11 is achieved without causing a significant increase in cost.

The force sensor diagnosis apparatus 50 according to the present embodiment obtains the delay time Δt elapsed after external force applied to the wheel 3 is detected by the force sensor 11 until the external force appears in the stroke S detected by the stroke sensor 19, and determines a malfunction of the force sensor 11 by comparing the vehicle-height direction force component detection value Fz_det and the vehicle-height direction force component estimation value Fz_est attributed to the same external force. This makes the vehicle-height direction force component detection value Fz_det and the vehicle-height direction force component estimation value Fz_est attributed to different external forces less likely to be compared, making it possible to reduce the possibility of erroneous determination of a malfunction of the force sensor 11.

The force sensor diagnosis apparatus 50 according to the present embodiment calculates the delay time Δt in a case where the derivative value dFz_d/dt of the vehicle-height direction force component detection value Fz_det and the derivative value dFz_e/dt of the vehicle-height direction force component estimation value Fz_est are each equal to or greater than the differentiation threshold dF_th set in advance. This makes it possible to prevent the burden on the processor from becoming too large by the number of calculations of the delay time Δt becoming too large. It is also possible to prevent a decrease in the accuracy of the calculation result of the delay time Δt, consequently in the accuracy of the malfunction detection result of the force sensor 11, due to a decrease in the accuracy of the matching between the vehicle-height direction force component detection value Fz_det and the vehicle-height direction force component estimation value Fz_est to be compared, out of the vehicle-height direction force component detection values Fz_det and the vehicle-height direction force component estimation values Fz_est recorded in the storage 53.

The force sensor diagnosis apparatus 50 according to the present embodiment determines that the force sensor 11 is malfunctioning in a case where the discrepancy ΔFz between the difference ΔFz_det between before and after the time t1 at which the vehicle-height direction force component detection value Fz_det increases and the difference ΔFz_est between before and after the time t2 at which the vehicle-height direction force component estimation value Fz_est increases is equal to or greater than the predetermined measurement threshold ΔFz_th. Thus, it is possible to determine a malfunction of the force sensor 11 by checking for a great discrepancy between the increase ranges of the vehicle-height direction force component detection value Fz_det and the vehicle-height direction force component estimation value Fz_est. This makes it possible to increase reliability of the determination result of the malfunction of the force sensor 11 even in a case where a variation occurs in the accuracy of the calculation result of the delay time Δt.

Although preferred embodiments of the disclosure have been described in the foregoing with reference to the accompanying drawings, the disclosure is by no means limited to such embodiments. It should be appreciated that various modifications and alterations may be made by persons skilled in the art without departing from the scope as defined by the appended claims. The disclosure is intended to include such modifications and alterations in so far as they fall within the scope of the appended claims.

For example, the foregoing embodiment describes an example in which the diagnosis unit 65 performs the time matching of the data on the vehicle-height direction force component detection value Fz_det and the vehicle-height direction force component estimation value Fz_est, by shifting the time of either of the vehicle-height direction force component detection value Fz_det and the vehicle-height direction force component estimation value Fz_est by the delay time Δt obtained by the delay time calculation process. However, the technology of the disclosure is not limited to this example. For example, in a case where the sensor signal of the force sensor 11 and the sensor signal of the stroke sensor 19 include synchronizing signals that allow for identification of the vehicle-height direction force component detection value Fz_det and the vehicle-height direction force component estimation value Fz_est due to the same external force applied to the wheel, it is possible to execute the malfunction detection of the force sensor 11 by identifying the corresponding vehicle-height direction force component detection value Fz_det and vehicle-height direction force component estimation value Fz_est.

In addition, in the foregoing embodiment, the stroke sensor 19 that detects the relative displacement between the rod and the cylinder of the damper 17 is used as the displacement sensor that detects the state quantity corresponding to the stroke displacement of the suspension 10. However, the technology of the disclosure is not limited to this example. The position where the stroke sensor 19 is provided is not particularly limited as long as the sensor is able to detect the relative displacement between the vehicle body 9 and the wheel 3. Further, the displacement sensor may be, for example, a displacement sensor that detects an elastic deformation amount of the spring 15. In a case of using a displacement sensor different from the stroke sensor 19 used in the foregoing embodiment, a map or a conversion formula that converts a displacement obtained from a sensor value of the displacement sensor into the displacement of the spring 15 and the damper 17 or of the stabilizer is recorded in the storage 53 in advance. Thus, it is possible to detect a malfunction of the force sensor 11 by using the sensor value of the displacement sensor, making it possible to achieve effects similar to the effects achieved by the foregoing embodiment.

DESCRIPTION OF REFERENCE NUMERALS

1 Vehicle
3 Wheel
3LF Left front wheel
3RF Right front wheel
3LR Left rear wheel
3RR Right rear wheel
5 Axle
9 Vehicle body
10 Suspension
11 Force sensor
13 Suspension arm
15 Spring
17 Damper
19 Stroke sensor
50 Diagnosis apparatus
51 Processor
53 Storage
61 Vehicle-height direction force component detection unit
63 Vehicle-height direction force component estimation unit
65 Diagnosis unit

The invention claimed is:

1. A force sensor diagnosis apparatus configured to perform a process of diagnosing a malfunction of a force sensor configured to detect external force applied to a wheel of a vehicle, the force sensor diagnosis apparatus comprising:
one or more processors; and
one or more memories communicably coupled to the one or more processors, wherein the one or more processors are configured to acquire a vehicle-height direction force component detection value on a basis of a sensor signal of the force sensor, the vehicle-height direction force component detection value being a force component in a height direction of the vehicle of external force applied to the wheel, calculate a vehicle-height direction force component estimation value on a basis of a sensor signal of a displacement sensor that is provided in a part of a suspension of the wheel and detects a state quantity corresponding to a stroke displacement of the suspension due to external force received by the wheel from a road surface, and perform malfunction determination of the force sensor by using a value of a difference obtained by comparing the vehicle-height direction force component detection value detected by the force sensor and the vehicle-height direction force component estimation value estimated on the basis of the sensor signal of the displacement sensor, and respective derivative values of the vehicle-height direction force component detection value and the vehicle-height direction force component estimation value.

2. The force sensor diagnosis apparatus according to claim 1, wherein the one or more processors are configured to obtain delay time elapsed after external force applied to the wheel is detected by the force sensor until the external force appears in the state quantity detected by the displacement sensor, identify, on a basis of the delay time, the vehicle-height direction force component detection value and the vehicle-height direction force component estimation value attributed to the same external force, and determine that the force sensor is malfunctioning in a case where a discrepancy between a difference between before and after a time at which the vehicle-height direction force component detection value increases and a difference between before and after a time at which the vehicle-height direction force component estimation value increases is equal to or greater than a predetermined measurement threshold.

3. The force sensor diagnosis apparatus according to claim 2, wherein the one or more processors are configured to obtain maximum values at peaks of the respective derivative values of the vehicle-height direction force component detection value and the vehicle-height direction force component estimation value, identify times at which the respective maximum values have been detected, and obtain a difference between the times as the delay time.

4. The force sensor diagnosis apparatus according to claim 1, wherein the one or more processors are configured to compare the respective derivative values of the vehicle-height direction force component detection value and the vehicle-height direction force component estimation value with a predetermined differentiation threshold set in advance, and execute the malfunction determination of the force sensor in a case where the respective derivative values of the vehicle-height direction force component detection value and the vehicle-height direction force component estimation value are equal to or greater than the predetermined differentiation threshold.

5. A force sensor diagnosis apparatus configured to perform a process of diagnosing a malfunction of a force sensor configured to detect external force applied to a wheel of a vehicle, the force sensor diagnosis apparatus comprising:
a vehicle-height direction force component detection unit configured to acquire a vehicle-height direction force component detection value on a basis of a sensor signal of the force sensor, the vehicle-height direction force component detection value being a force component in a height direction of the vehicle of external force applied to the wheel;
a vehicle-height direction force component estimation unit configured calculate a vehicle-height direction force component estimation value on a basis of a sensor signal of a displacement sensor that is provided in a part of a suspension of the wheel and detects a state quantity corresponding to a stroke displacement of the suspension due to external force received by the wheel from a road surface; and
a diagnosis unit configured perform malfunction determination of the force sensor by using a value of a difference obtained by comparing the vehicle-height direction force component detection value detected by the force sensor and the vehicle-height direction force component estimation value estimated on the basis of the sensor signal of the displacement sensor, and respective derivative values of the vehicle-height direction force component detection value and the vehicle-height direction force component estimation value.

6. A vehicle provided with a force sensor configured to detect external force applied to a wheel of the vehicle, the vehicle comprising a diagnosis apparatus configured to perform a process of diagnosing a malfunction of the force sensor, the diagnosis apparatus including one or more processors, and one or more memories communicably coupled to the one or more processors, wherein the one or more processors are configured to acquire a sensor signal of a displacement sensor that is provided in a part of a suspension of the wheel and detects a state quantity corresponding to a stroke displacement of the suspension due to external force received by the wheel from a road surface, acquire a vehicle-height direction force component detection value on a basis of a sensor signal of the force sensor, the vehicle-height direction force component detection value being a force component in a height direction of the vehicle of external force applied to the wheel, and perform malfunction determination of the force sensor by using a value of a difference obtained by comparing a vehicle-height direction force component estimation value estimated on a basis of the sensor signal of the displacement sensor and the vehicle-height direction force component detection value detected by the force sensor, and respective derivative values of the vehicle-height direction force component detection value and the vehicle-height direction force component estimation value.

7. A non-transitory recording medium containing a computer program to be applied to a diagnosis apparatus configured to perform a process of diagnosing a malfunction of a force sensor configured to detect external force applied to a wheel in at least a vehicle-height direction, the computer program causing one or more processors to execute processing comprising:

acquiring a sensor signal of a displacement sensor that is provided in a part of a suspension of the wheel and detects a state quantity corresponding to a stroke displacement of the suspension due to external force received by the wheel from a road surface;

acquiring a vehicle-height direction force component detection value on a basis of a sensor signal of the force sensor, the vehicle-height direction force component detection value being a force component in a height direction of the vehicle of external force applied to the wheel; and performing malfunction determination of the force sensor by using a value of a difference obtained by comparing a vehicle-height direction force component estimation value estimated on a basis of the sensor signal of the displacement sensor and the vehicle-height direction force component detection value detected by the force sensor, and respective derivative values of the vehicle-height direction force component detection value and the vehicle-height direction force component estimation value.

* * * * *